United States Patent
Scholtyssek

(10) Patent No.: US 12,348,377 B2
(45) Date of Patent: Jul. 1, 2025

(54) METHOD FOR DETERMINING A CHAIN POSITION OF A NETWORK SUBSCRIBER

(71) Applicant: GEA FARM TECHNOLOGIES GMBH, Bönen (DE)

(72) Inventor: Marco Scholtyssek, Fröndenberg (DE)

(73) Assignee: GEA Farm Technologies GmbH, Bönen (DE)

( * ) Notice: Subject to any disclaimer, the term of this patent is extended or adjusted under 35 U.S.C. 154(b) by 9 days.

(21) Appl. No.: 18/568,314

(22) PCT Filed: Jun. 9, 2022

(86) PCT No.: PCT/EP2022/065712
§ 371 (c)(1),
(2) Date: Dec. 8, 2023

(87) PCT Pub. No.: WO2022/258761
PCT Pub. Date: Dec. 15, 2022

(65) Prior Publication Data
US 2024/0291719 A1    Aug. 29, 2024

(30) Foreign Application Priority Data
Jun. 11, 2021 (DE) .............. 10 2021 115 176.7

(51) Int. Cl.
*H04L 12/801* (2013.01)
*H04L 12/861* (2013.01)
(Continued)

(52) U.S. Cl.
CPC .................. *H04L 41/12* (2013.01)

(58) Field of Classification Search
CPC ..... H04L 41/12; H04L 12/801; H04L 12/861; H04L 29/06; H04L 63/1416; G22C 8/16
(Continued)

(56) References Cited

U.S. PATENT DOCUMENTS

| | | | | |
|---|---|---|---|---|
| 9,432,298 | B1* | 8/2016 | Smith | H04L 49/9057 |
| 2007/0286011 | A1* | 12/2007 | Chung | G11C 7/10 365/230.05 |

(Continued)

FOREIGN PATENT DOCUMENTS

EP    3819732 A1    5/2021

OTHER PUBLICATIONS

International Search Report and Written Opinion mailed Oct. 31, 2022 in related/corresponding International Application No. PCT/EP2022/065712.

(Continued)

*Primary Examiner* — Jude Jean Gilles
(74) *Attorney, Agent, or Firm* — PATENT PORTFOLIO BUILDERS PLLC

(57) ABSTRACT

A method for determining a chain position of a network subscriber in an Ethernet network, in which the network subscribers are connected in a daisy chain. In a first step one of the two ports of the Ethernet gateway is deactivated. In a second step a status message from one of the network subscribers concerning non-connected ports of the network subscriber in question is acquired. In a third step at least one identification number is extracted from the status message from the network subscriber in question and a first chain position is assigned to the identification number. In a fourth step the other port of the network subscriber in question is deactivated. The first through fourth steps are repeated until all of the network subscribers with their identification number have been acquired. Subsequent chain positions are assigned in the repetitions of the third step.

12 Claims, 9 Drawing Sheets

(51) Int. Cl.
  *H04L 29/06* (2006.01)
  *H04L 41/12* (2022.01)
  *G11C 8/16* (2006.01)
(58) Field of Classification Search
  USPC .......................................................... 709/238
  See application file for complete search history.

(56) References Cited

U.S. PATENT DOCUMENTS

2019/0385057 A1\* 12/2019 Litichever ............... H04L 63/14
2020/0162285 A1   5/2020 Drury et al.
2020/0389469 A1\* 12/2020 Litichever ............. H04L 63/145

OTHER PUBLICATIONS

Search Report created Aug. 23, 2023 in related/corresponding DE Application No. 10 2021 115 176.7.

\* cited by examiner

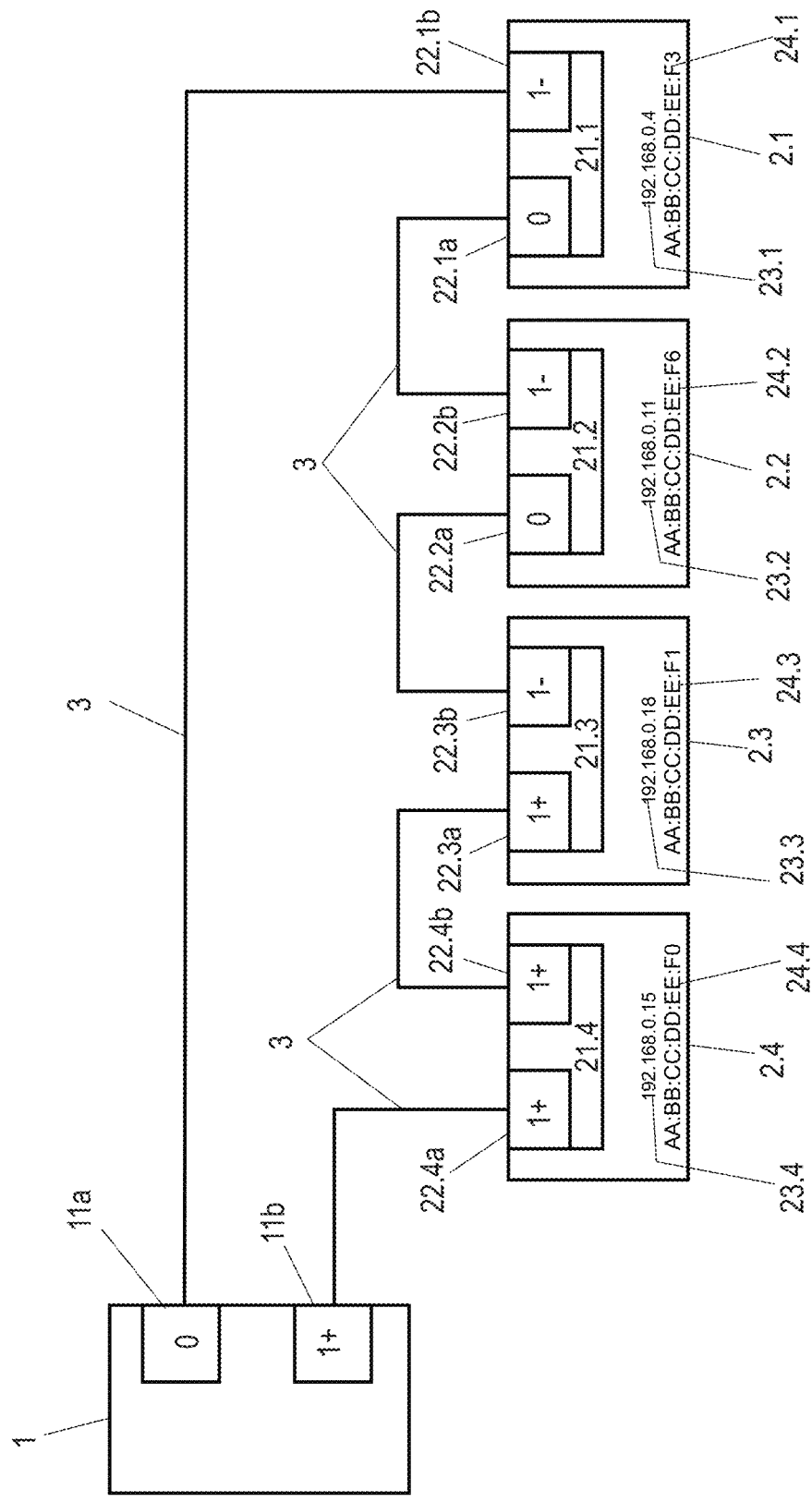

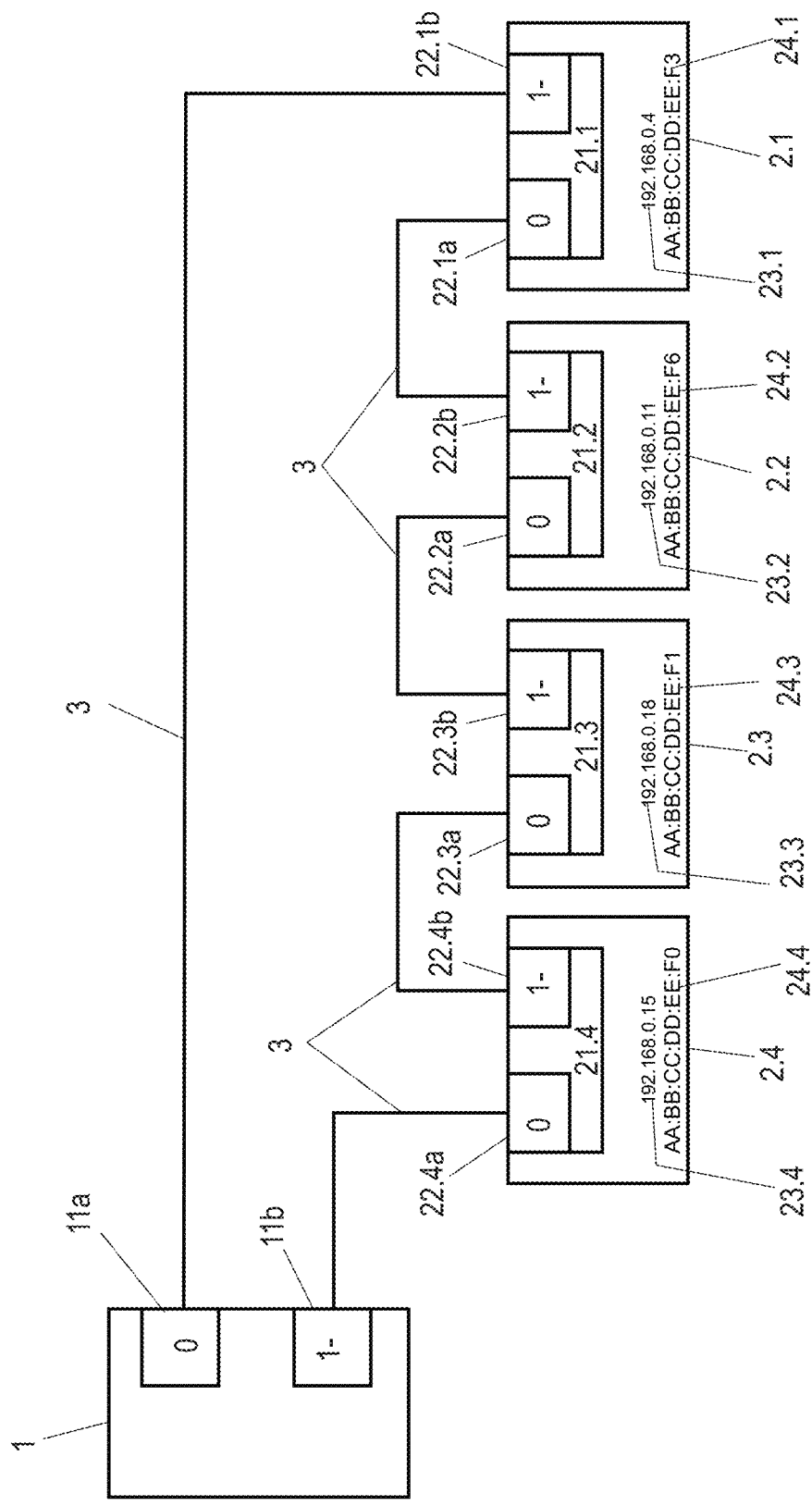

METHOD FOR DETERMINING A CHAIN POSITION OF A NETWORK SUBSCRIBER

BACKGROUND AND SUMMARY OF THE INVENTION

Exemplary embodiments of the invention relate to a method for determining a chain position of a network subscriber in an Ethernet network, in which the network subscribers are connected to one another in a daisy chain and the daisy chain is coupled at its two ends to a respective port of an Ethernet gateway. Exemplary embodiments of the invention further relate to an arrangement of agricultural devices having network subscribers suitable for carrying out the method.

Classically, a star topology is often used in Ethernet networks, in which a plurality of network subscribers are connected in a star configuration to one port of a gateway each. In this topology, an assignment of identifiers of the network subscribers, i.e., for example, the IP (Internet Protocol) address assigned to them or the MAC (Media Access Control) address inherently assigned to them and the port (connection) to which the network subscriber is coupled, can be queried in a simple manner. Such a query is relevant, for example, if there are a large number of similar network subscribers in a system.

Agricultural installations, for example milking parlors, often have such a large number of initially similar network subscribers. An example of a milking parlor is a milking carousel on which there may be a large number of similar milking places arranged along the perimeter of the milking carousel and whose control device is provided with an Ethernet connection for monitoring and/or control. The places are assigned a place number circumferentially. If, based on a wiring diagram, the assignment between the location number and the port of the gateway in a star topology is known, an identification number, e.g. the IP address and/or the MAC address, can be determined for each location in a simple manner.

In addition to the star topology, a daisy chain topology is now also used in Ethernet networks. For this purpose, suitable network subscribers have two Ethernet ports with which they are coupled to their neighbors or, at the end of the chain, to one port each of a gateway. The resulting ring structure offers the advantages of simpler cabling between the network subscribers and also a certain redundancy, since at least one interruption of a connection can be compensated for by the fact that the network subscribers can be reached from different sides.

Daisy chain topology can also be used in agricultural installations, for example the milking carousel described above or other milking parlors, i.e., arrangements of milking places, in particular to reduce the amount of wiring required.

With the daisy chain topology, too, a list of identification numbers of the network subscribers, e.g., a list of IP addresses and/or MAC addresses, can be recorded in a simple manner, but no information is available about which network subscriber is located at which position within the daisy chain. Accordingly, a mapping between position numbers on the milking carousel and identification numbers can no longer be created in a simple manner.

Instead, an identification number of the network subscriber must be read locally at the network subscriber during installation or determined via a directly connected service computer, and the identification number must then be assigned to the position number in an assignment table. This process could be simplified if it were possible to automatically record which network subscriber holds which position within the daisy chain. In this case, the corresponding table with the assignment of location numbers and network subscribers can be created from the known wiring diagram.

Exemplary embodiments of the present invention are accordingly directed to a method for determining a chain position of a network subscriber within an Ethernet daisy chain topology, as well as to an agricultural arrangement having a plurality of network subscribers with which this method can be carried out.

A method according to the invention of the kind mentioned at the beginning is characterized by the following steps: In a first step (a), one of the two ports of the Ethernet gateway is deactivated, and subsequently, in a step (b), a status message of one of the network subscribers relating to a non-connected port is acquired. From the status message, in a step (c), an identification number of the relevant network subscriber is extracted and assigned to a first chain position. In a step (d), the other port of the respective network subscriber is then deactivated. Steps (b) to (d) are then repeated until all network subscribers are acquired with their identifier, wherein subsequent, in particular ascending or descending, chain positions are assigned in the repetitions of step (c).

In order to be able to compensate for the failure of a network line in the Ethernet daisy chain topology, the network subscribers have the ability to detect and report to the switch a port that is not connected to an active port of another network subscriber. In a method according to the invention, the network subscribers are further adapted to disable a port in response to a request. The method according to the invention then uses these capabilities to be able to query information about the positions of the network subscribers within the daisy chain via a targeted deactivation of ports. The chain is successively shortened from one end to the other by deactivating ports and thus making network subscribers "invisible", and the network subscriber at the end of the chain can be identified. Since the port deactivation is only temporary, the entire chain can be reactivated after all network subscribers have been detected and is then ready for regular network operation again.

Initially, the gateway and the network subscribers are directly involved in carrying out the method. The method can be coordinated by a controller of the gateway itself, e.g., after a request by a higher-level controller or by a service computer that is connected to the gateway via a network. It is understood that the higher-level controller or the service computer may be connected to the gateway via an intranet or the Internet. The method can also be coordinated by an entity external to the gateway, e.g., the higher-level controller or the service computer.

In an advantageous design, the deactivation of a network subscriber's port may be cancelled by the network subscriber itself after a predetermined time has elapsed after the port has been deactivated, e.g., by the network subscriber starting a timer after a port has been deactivated, after which the port is reactivated.

In a further design, it can be provided that the deactivation of a port can be terminated immediately by the network subscriber when it detects that a connection to another network subscriber or the Ethernet gateway exists again at its other port. In this case, the entire daisy chain can be reactivated successively and without waiting times by running individual timers, by reactivating the previously deactivated port of the Ethernet gateway.

In a further advantageous design of the method, it can be provided that the actions in steps (b) and/or (d) are performed independently by the respective network subscriber. Alternatively, the status message in step (b) and/or the deactivation of the port in step (d) can also be performed by the network subscriber after a request by the gateway or an entity externally connected to it.

As a result of the method, a table can be created, e.g., by the Ethernet gateway or also by an external unit, which, starting from the port deactivated at the beginning, uniquely reproduces identification numbers, e.g., IP addresses and/or MAC addresses, of the network subscribers and their positions within the daisy chain. With a given wiring diagram of the arrangement, the identification numbers of the network subscribers can then be uniquely assigned to the real network subscribers.

An arrangement according to the invention with agricultural devices, which each have at least one network interface, which are connected as network subscribers with a gateway in an Ethernet daisy chain topology, is set up to carry out the aforementioned method. Advantageously, the arrangement has a plurality of similar devices and is, for example, an arrangement of a plurality of milking places, in particular a milking carousel. The advantages described in connection with the method are obtained.

BRIEF DESCRIPTION OF THE DRAWING FIGURES

The invention is explained in more detail below by means of exemplary embodiments with the aid of figures, wherein:

FIGS. 2a-2e show in each case a schematic representation of the arrangement according to FIG. 1 in various operating states during the performance of a method according to the invention;

DETAILED DESCRIPTION

Figure 1:
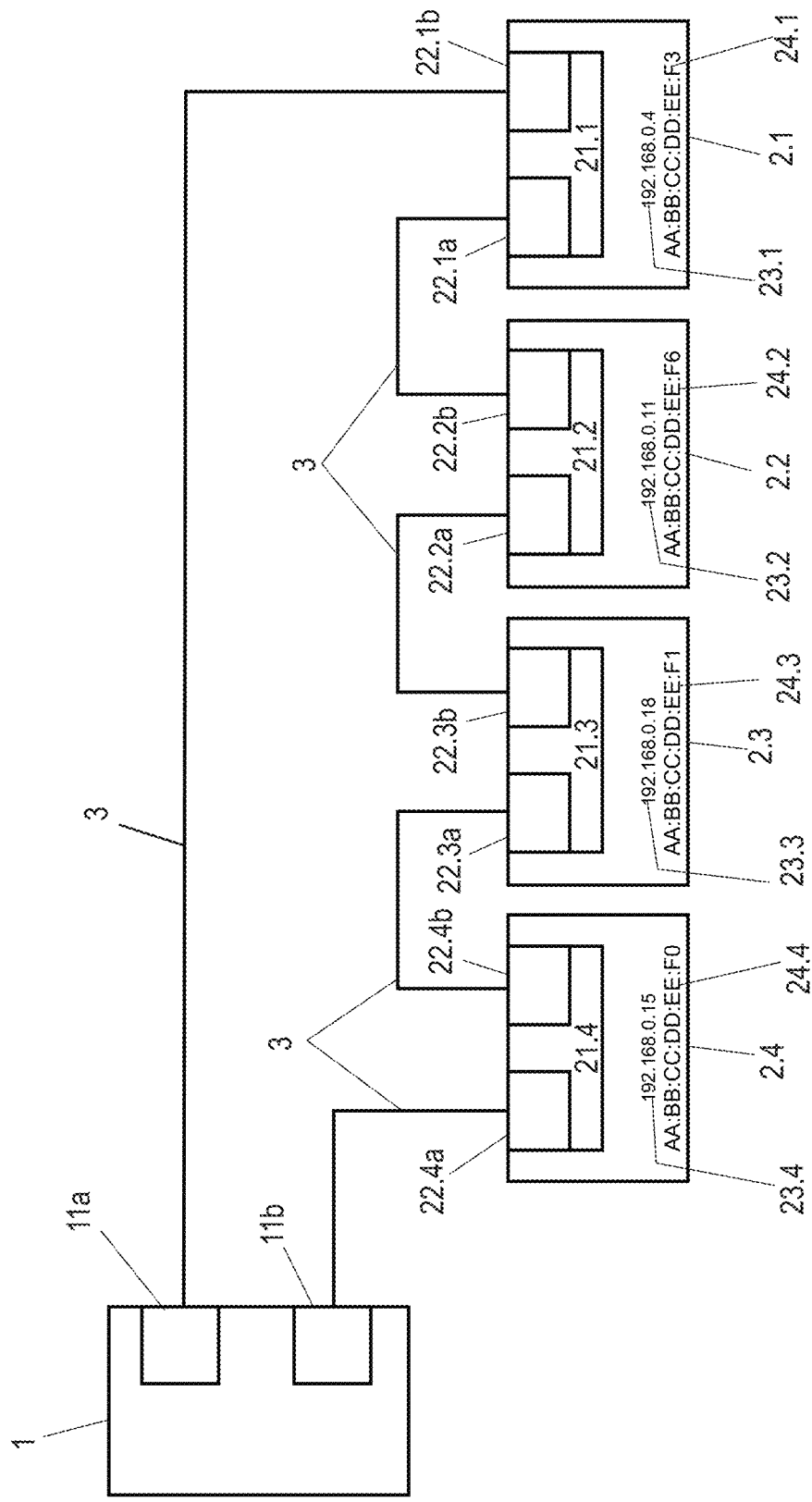
FIG. 1 shows a schematic representation of an arrangement of network subscribers and a gateway in an Ethernet daisy chain topology.

FIG. 1 shows an exemplary block diagram of an arrangement of several, here exemplarily four devices 2.1-2.4, which are coupled in a daisy chain topology with a gateway 1.

The gateway 1 may be, for example, an Ethernet switch or other network device capable of connecting the daisy chain of devices 2.1-2.4 to a higher-level network. The gateway 1 may itself be set up to coordinate the method described below. In this context, the execution of the method can be initiated by a higher-level unit connected to the gateway 1 via the network, e.g., a control unit of the milking parlor. It is also conceivable that the method is coordinated by the higher-level unit itself.

The gateway 1 has two ports (network connections) 11*a*, 11*b*, which are coupled to the ends of the daisy chain. In the daisy chain itself, the devices 2.1-2.4 are arranged in series. Each of the devices 2.1-2.4 has a network interface 21.1-21.4 which, like the gateway 1, provides two ports which are indicated in FIG. 1 by the reference signs 22.1*a*-22.4*a* for a first port and 22.1*b*-22.4*b* for a second port. Ports with index "a" are each connected to the port with index "b" of their neighbor via network connections 3, resulting in the loop arrangement visible in FIG. 1.

In the arrangement shown, for example, the devices 2.1-2.4 are milking places of a milking parlor whose control devices have the network connections shown for monitoring and/or control purposes.

After connecting the components shown, each network subscriber 21.1-21.4 is assigned an IP address, which is indicated in FIG. 1 by the reference sign 23.1-23.4. Further, each network subscriber 21.1-21.4 has a MAC address 24.1-24.4 permanently assigned to it, which is also shown in FIG. 1. After wiring the components, the gateway 1 thus knows how many network subscribers 21.1-21.4 are present and which IP address 23.1-23.4 or MAC address 24.1-24.4 they each have.

On the other hand, it is not known to gateway 1 or the higher-level unit in which order these detected network subscribers 21.1-21.4 are located within the daisy chain.

The IP addresses 23.1-23.4 given by way of example in FIG. 1 indicate, for example, that these addresses are not assigned successively and ascendingly in the order of the arrangement of the network subscribers 21.1-21.4 within the chain, but that this assignment is rather random.

In operation of the arrangement shown in FIG. 1, an interruption is usually deliberately formed at a point in the loop formed by deactivating one of the ports 11*a, b* or 22.1*a, b*-22.4*a, b* so that each network subscriber 21.1-21.4 can only be reached from one direction in order to prevent data collisions. For this purpose, for example, the RSTP (Rapid Spanning Tree Protocol) technology known in Ethernet networks can be used, which leads to the automatic creation of a tree-like structure of a network during operation. If, during operation, a network connection 3 then actually fails or one of the ports 11*a, b* or 22.1*a, b*-22.4*a, b* mentioned is inoperative, the previously deactivated port is automatically reactivated so that the actual point of failure represents the point of interruption in the loop. An error location can be compensated in this way.

A method according to the invention for detecting a position of a network subscriber within the daisy chain is explained below with reference to FIGS. 2*a*-2*e*. These figures each show the block diagram already shown in FIG. 1 in various method steps with different states of the ports 11*a, b* and 22.1*a, b*-22.4*a, b* involved.

The status of ports 11*a, b* or 22.1*a, b*-22.4*a, b* is indicated by the symbols "0", "1+" and "1-" on the respective port. The symbol "0" indicates a deactivated port. The symbol "1+" indicates an activated port that recognizes it is connected to a likewise activated and functional port of a neighboring network subscriber or of the gateway. The symbol "1-" indicates an activated port, which, however, recognizes that there is no connection to an active and functional port of a neighboring network subscriber.

In a preparatory step of the method, the gateway 1 itself or the higher-level unit can send a command into the daisy chain via the gateway 1 that marks the start of the method and, optionally, puts the network subscribers 21.1-21.4 into an initialization mode. In response, the network subscribers 21.1-21.4 acknowledge receipt, sending their current IP address 23.1-23.4 and their MAC address 24.1-24.4 back to the gateway 1 or the higher-level unit. If no device table has been created yet, this is now carried out by saving the number of network subscribers 21.1-21.4 and the assignment of IP addresses 23.1-23.4 to MAC addresses 24.1-24.4.

Figure 2A:
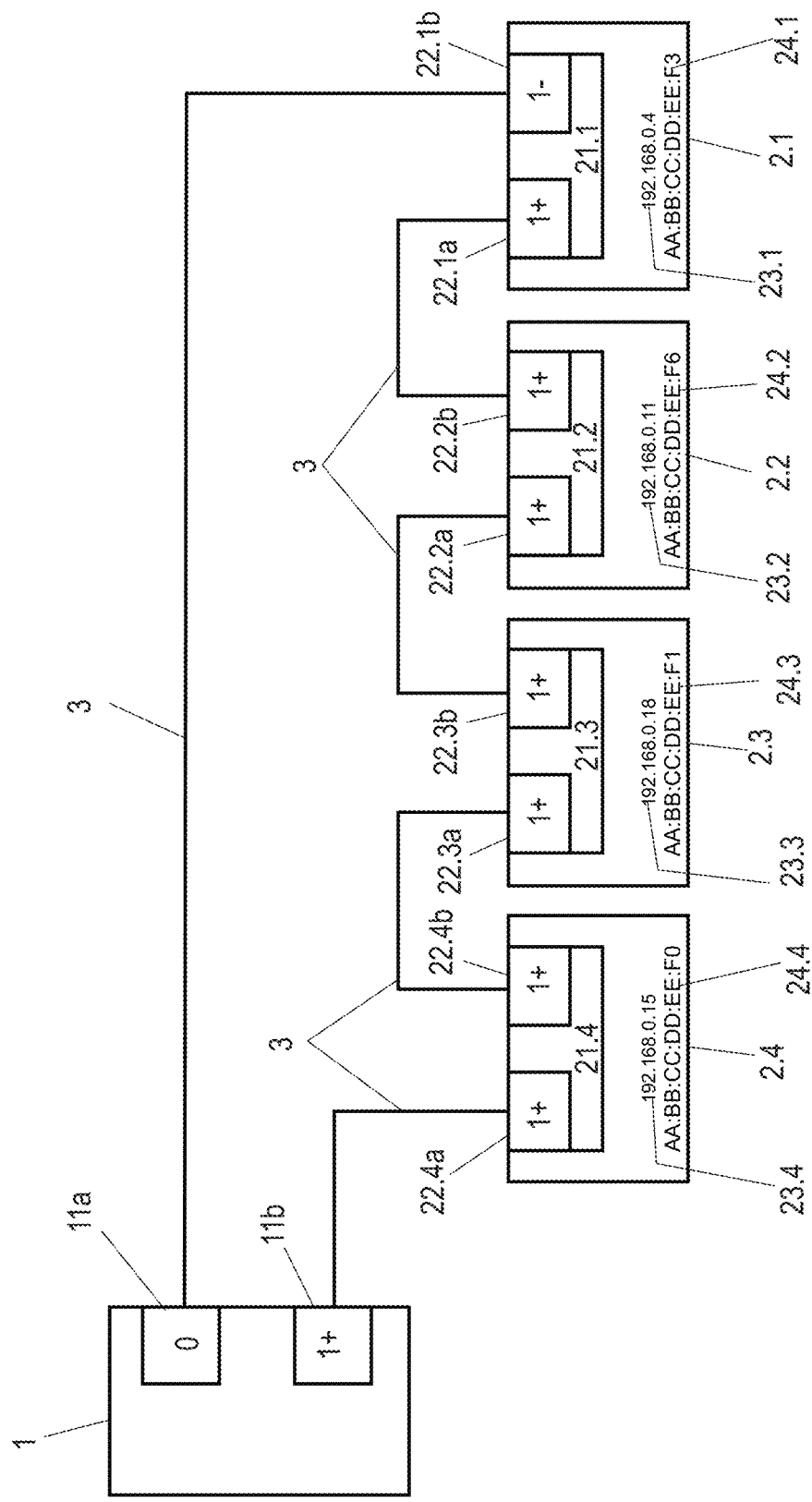

In a first method step (a), the gateway 1 deactivates one of the two ports 11*a*, 11*b*, exemplarily the first port 11*a*. This is represented in FIG. 2*a* by the symbol "0" on port 11*a* of gateway 1. As a result, the network subscriber 21.1 recognizes that its port 22.1b has no active connection and sets its status to "1–". All other ports in the system have the status "1+".

In a next method step (b), the network subscriber 2.1, which has detected the status change on its port 22.1b, sends this status change to the gateway 1 (or the higher-level unit), which thus knows that this device 2.1 with the network subscriber 21.1 and the IP and MAC addresses 23.1 and 24.1 transmitted with the status report is the device directly connected to port 11a, i.e. the device with position number 1 in the daisy chain. The network subscribers 21.1-21.4 may be arranged to independently send a corresponding status report to the gateway 1 or the higher-level unit when they detect a change in state of one of their ports 22.1a, b-22.4a, b. Alternatively, it may be provided that the gateway 1 or the higher-level unit sends a request into the daisy chain asking the network subscribers 21.1-21.4 to report the status of their ports 22.1a, b-22.4a, b.

Figure 2B:
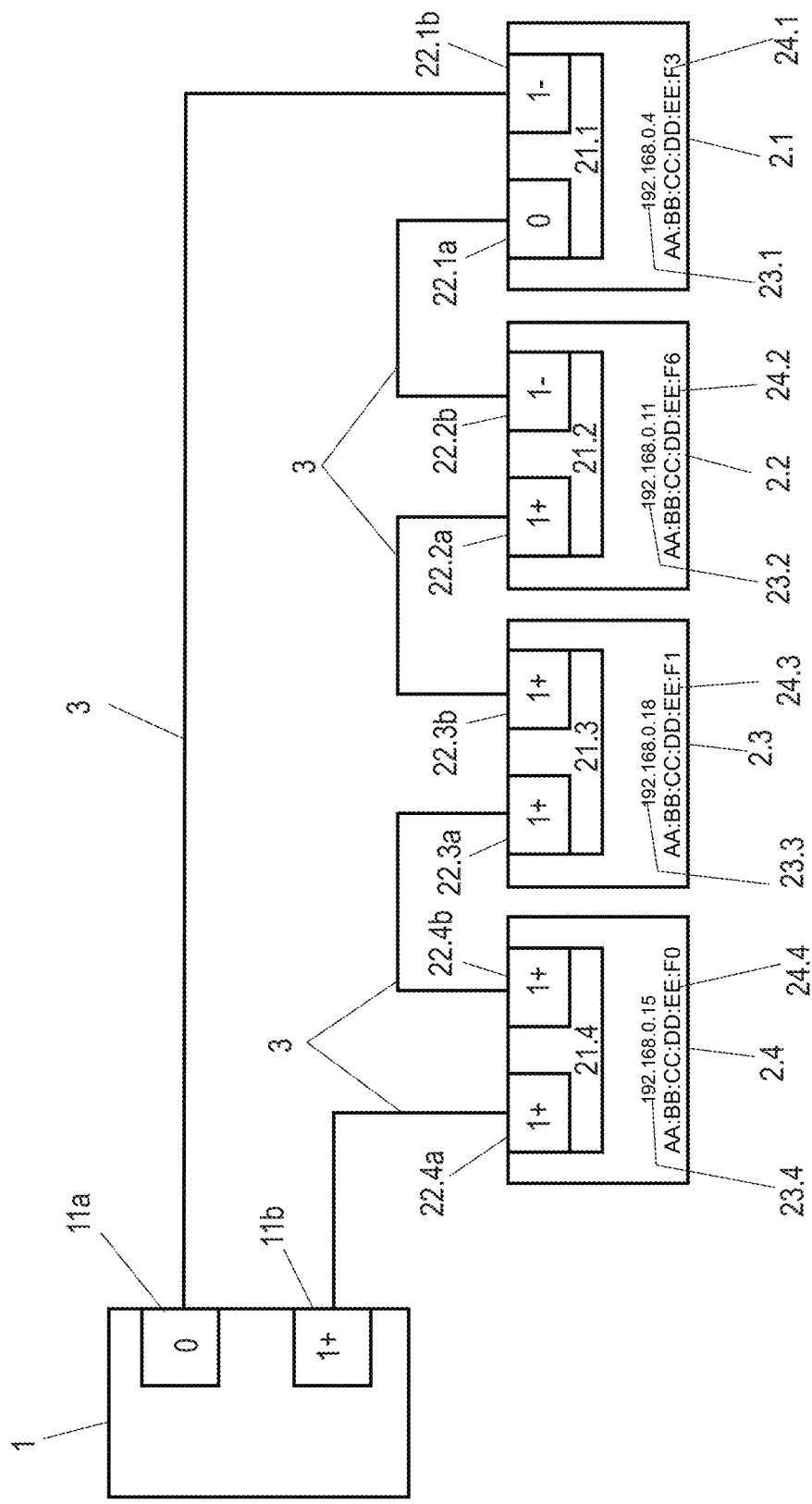

In a next step (c), the network subscriber 21.1 deactivates the port 22.1a that was previously still active. The resulting state is shown in FIG. 2b. The deactivation can either take place after an immediate request by the gateway 1 or the higher-level unit in a direct message to the network subscriber 21.1, since its IP address 23.1 is known after receiving the status message. Alternatively, a request can be sent by the gateway 1 or the higher-level unit to all network subscribers 21.1-21.4 that those network subscribers 21.1-21.4 that have one port in the "1-" state disable the other of their ports. In addition, when sending such a request, the network subscriber 21.1 would disable port 22.1a. As another alternative, it is also conceivable that a network subscriber 21.1-21.4 that is in the initialization mode would automatically disable its other port after detecting the disconnected port with the status "–1" and sending the status message about it.

After this step, step (b) is repeated, namely that the deactivated port-now port 22.1a of network subscriber 21.1—is recognized by network subscriber 21.2. In FIG. 2b this is to be recognized by assumption of the state "1-" at the port 22.2b. The network subscriber 21.2 then sends the message that it has detected a connection failure at port 22.2b to the gateway 1 or the higher-level unit, which can then assign the transmitted IP address 23.2 and the co-transmitted MAC address 24.2 to the network subscriber 21.2 and the second place in the daisy chain. Again, the device 2.2 with the network subscriber 21.2 is requested to deactivate its other port, port 22.2a, or deactivates it independently, which leads to the state shown in FIG. 2c.

Steps (b) and (c) are then repeated until finally the last device 2.4 directly connected to gateway 1 at port 11b with network subscriber 21.4 has deactivated its port 22.4a, which is detected by gateway 1 at port 11b. This is shown in FIG. 2d. Thus, the gateway knows that all network subscribers 21.1-21.4 including their position within the daisy chain have been detected. The gateway 1 or the higher-level unit has thus completed the device table by the position within the daisy chain, also called "chain position".

Figure 2E:
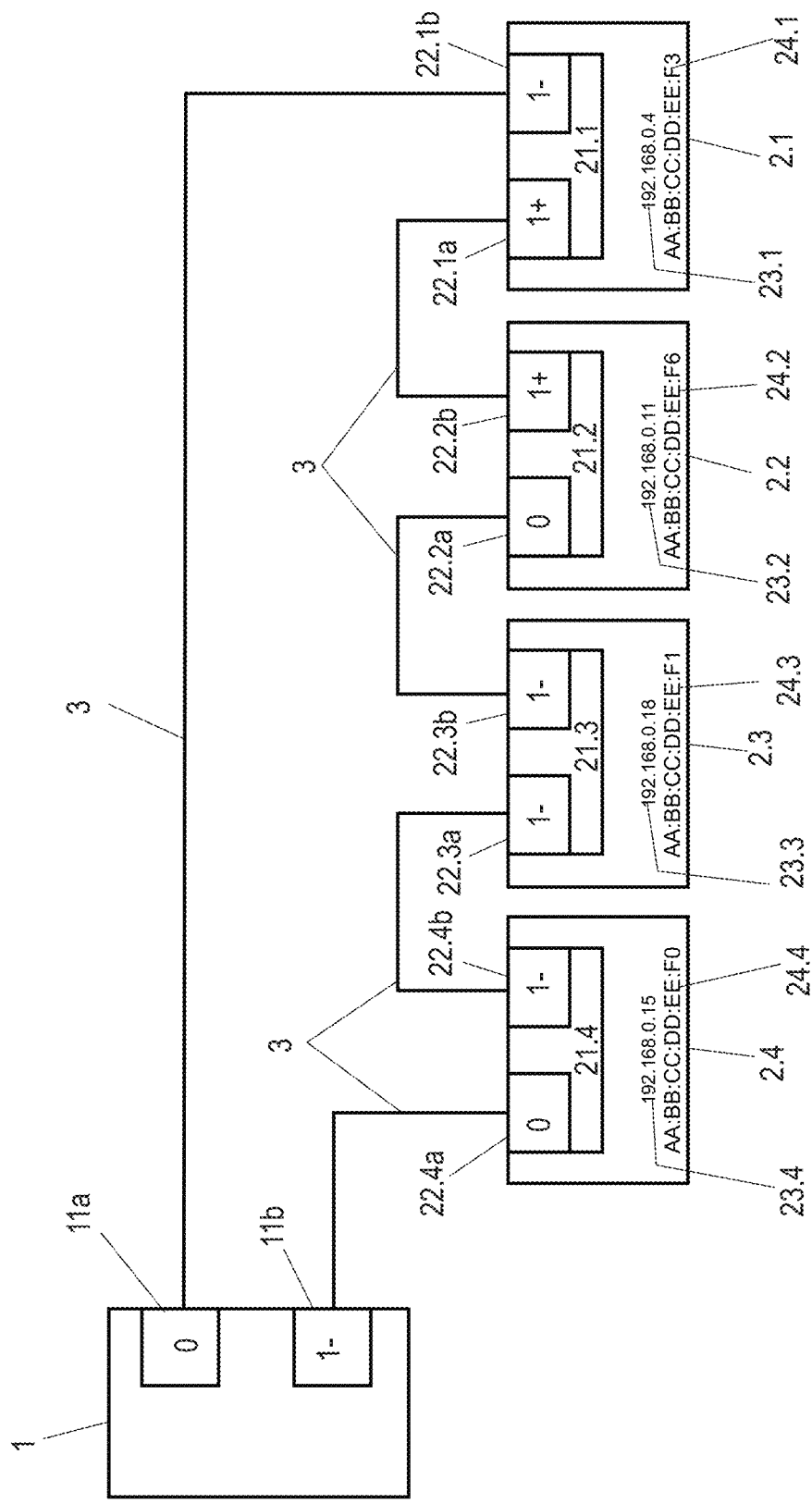

The detection procedure is finished with this step, whereupon the daisy chain can be set back to an operating state of normal network operation. This can be carried out in such a way that, for example, the device 2.1 or its network subscriber 21.1 sets the state of port 22.1a from "disabled" back to "enabled". For this purpose, for example, a timer may be provided in each network subscriber 21.1-21.4, which is started when the respective port 22.1a-22.4a is deactivated, with the deactivation of the port being cancelled after the timer expires. As a result, the port connected to it, in this method state the port 22.2b of the network subscriber 21.2, also recognizes that it is again connected to an active port and sets its state to "1+" as well. This is shown in FIG. 2e.

After the timers of devices 2.2-2.4 have also expired, the entire daisy chain is thus ready for use again. To speed up the method, it can be provided that when an active connection is detected on one of the ports, the other port is automatically reactivated as well. In this case, the network device 2.2 would immediately also activate its port 22.2a from the state shown in FIG. 2e (i.e. after the timer of the device 2.1 has expired and the port 22.1a has been reactivated). In the manner of a chain reaction, the activation then also extends almost immediately to the network devices 2.3 and 2.4.

In an alternative design, this chain reaction may also be triggered directly by gateway 1 by activating port 11a, which would cause device 2.1 and subsequently devices 2.2-2.4 to also activate their disabled ports, even if no expiring timer is provided in the network devices.

The device table created in this way, which e.g., the gateway 1 or the higher-level unit has built up, can now be used by any applications that benefit from or depend on space allocation. It can also be used, for example, to instruct a DHCP (Dynamic Host Configuration Protocol) server to assign the individual devices 2.1-2.4 or their network subscribers 21.1-21.4 desired predefined IP addresses that may reflect the place number. Furthermore, names can be automatically assigned to the IP addresses in the network by a DNS (Domain Name Service) service using this device table, which also depend on or reflect the location number. Also, if there are connection problems between devices 2.1-2.4, the created table can be used to specifically indicate between which devices 2.1-2.4 the problem exists, which simplifies troubleshooting for service technicians.

Figure 3:
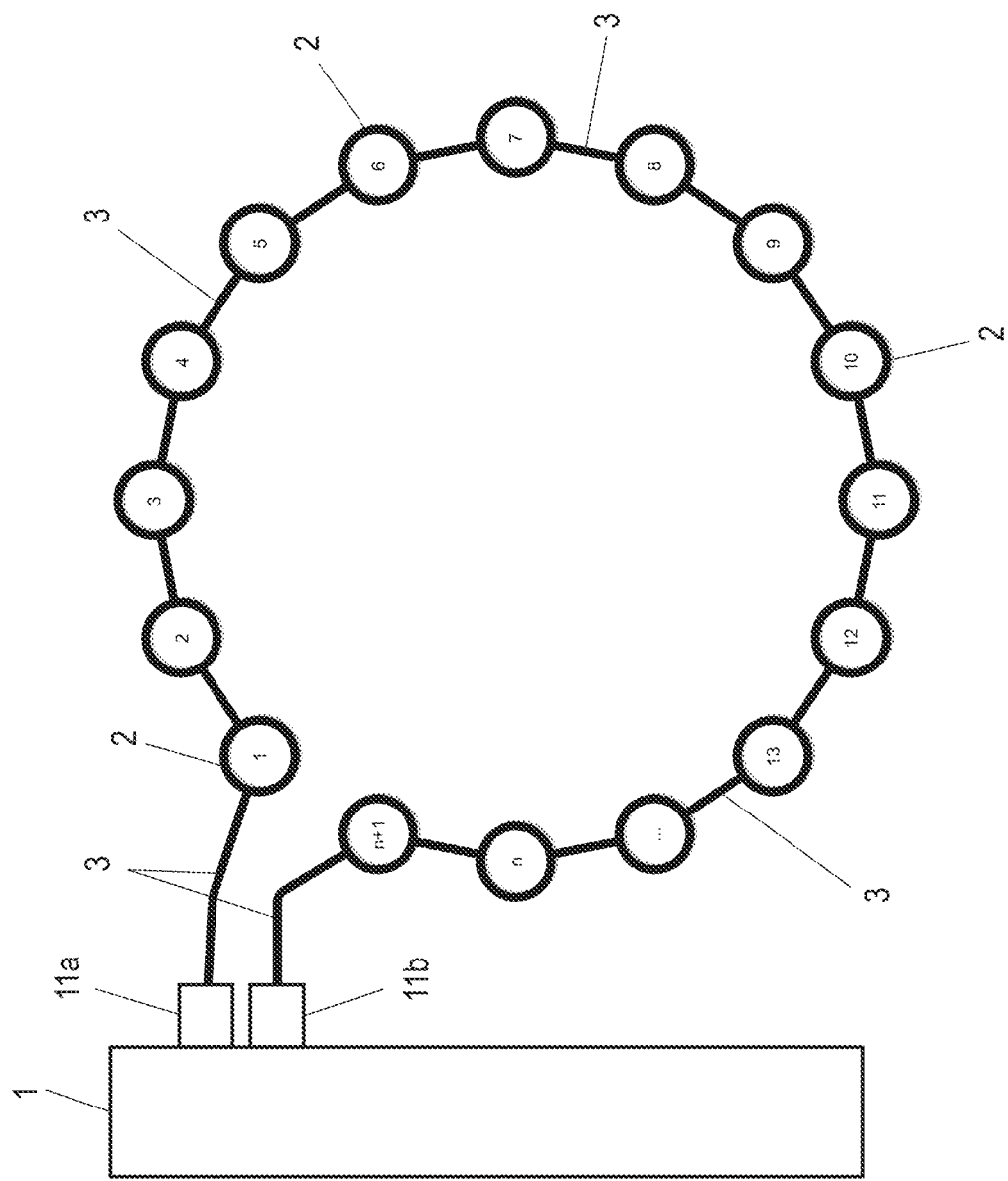
FIGS. 3-4 show in each case a schematic representation of an arrangement of a plurality of milking places with network subscribers in a milking parlor.

FIG. 3 shows a block diagram or wiring diagram of a milking carousel as an example of a milking parlor arrangement in which the described method can be used.

A plurality of devices 2 are connected in the form of a daisy chain with connections 3 to each other and to two ports 11a, 11b of a gateway 1. As in the example of FIG. 1, the devices 2 each have a network interface (corresponding to the network subscribers 21.1-21.4 of FIG. 1) with two ports, but these are not shown in more detail here for reasons of clarity. In total, the milking carousel shown comprises 16 devices 2. The devices 2 correspond to the milking places of the milking parlor arrangement and are therefore also referred to below as milking places 2.

When carrying out the previously described method, starting from port 11a, a detection of the milking places 2 including an assignment of the IP or MAC addresses to the individual places along the milking carousel can take place.

Assuming that the milking parlor 2 connected to port 11a is "place number 1" of the milking carousel, the detected position of each of the milking places 2 in the daisy chain directly represents its place number in the milking carousel. Assigning the "place number 1" to another of the milking places 2 results in a corresponding offset with respect to the determined position number in the daisy chain. In this way, the method according to the invention can be used in a straightforward manner to automatically record the IP and/or MAC addresses for the individual milking places 2 and their place numbers.

Figure 4:
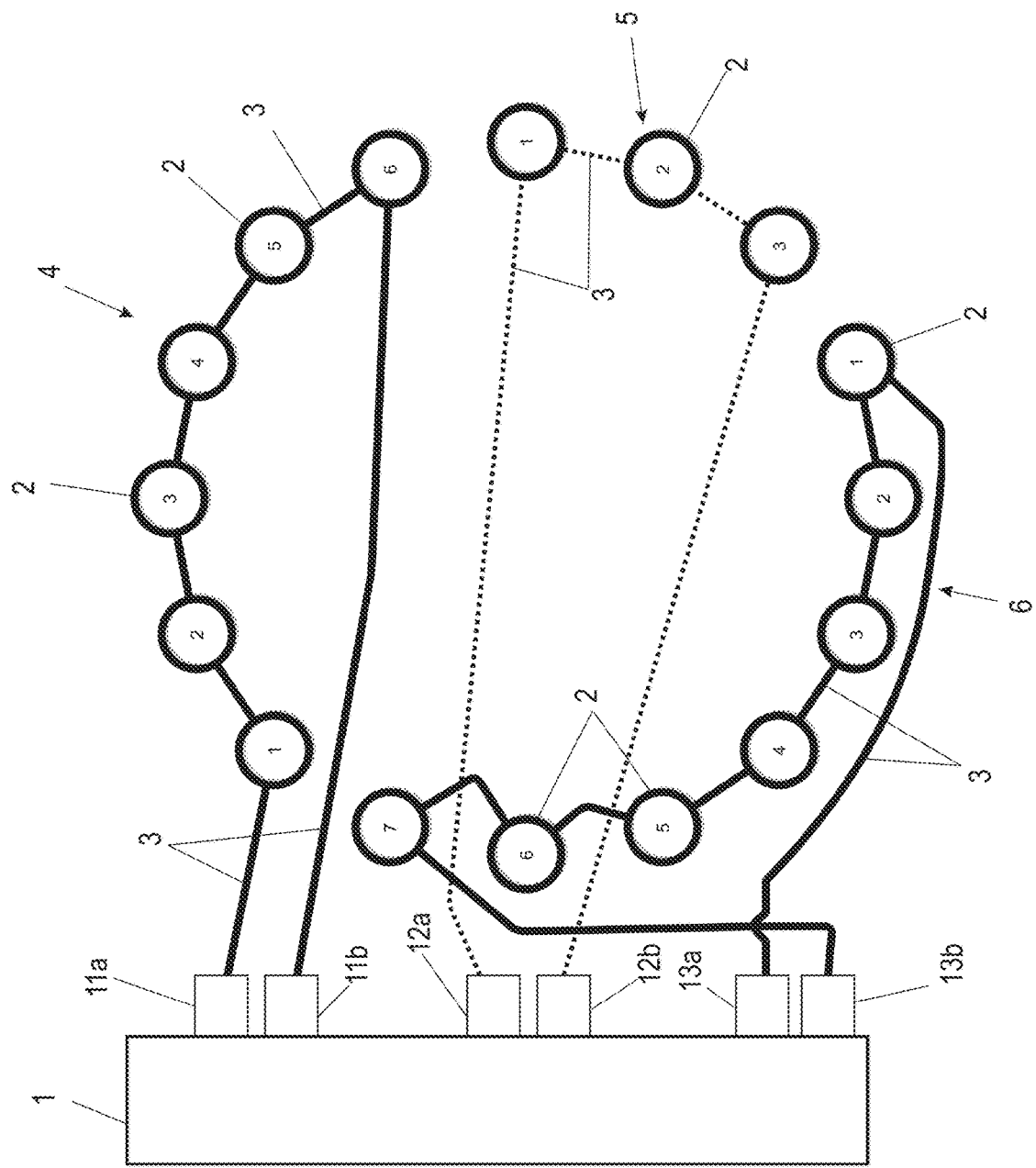

FIG. 4 shows a comparable milking carousel with a plurality of milking places 2 which, in contrast to the exemplary embodiment of FIG. 3, are not connected in a daisy chain, but in three separate daisy chains. The milking places are identified as device groups 4, 5 and 6 in FIG. 4, wherein the milking places of each of the device groups 4-6 are coupled by a daisy chain.

Device group 4 has a daisy chain of a length of six milking places 2 coupled to the gateway 1 at two ports 11a, 11b. Subscriber group 5 comprises three milking places 2 coupled in the form of a daisy chain to two ports 12a, 12b. Finally, the third device group 6 comprises seven milking places 2 coupled as a daisy chain to ports 13a, 13b of the gateway 1.

The previously described method for determining an assignment of IP and/or MAC address to a position of a device 2 in a daisy chain can now be performed separately for each of the three device groups 4-6, i.e., each of the daisy chains. The wiring diagram shows that in the wiring shown, the first detected device 2 of the second daisy chain (device group 5) connects to the last device of the first daisy chain (device group 4). Further, the first device of the third daisy chain (device group 6) connects to the last device of the second daisy chain (device group 5). With this information from the wiring diagram, the three separately created device tables for the individual daisy chains can be combined and an assignment of IP or MAC addresses to place numbers on the milking carousel can be made. Again, only one assignment is to be specified here, which concerns the milking place with the place number 1.

It is noted that the three device groups 4-6 do not necessarily have to connect to each other as in the example shown in FIG. 4. The groups can also be wired into each other with different orientation and/or interleaved, but the information on how the groups are related to be assigned to a circulating ascending place number is then needed when assigning them to an actual physical place on the milking carousel.

Figure 5:
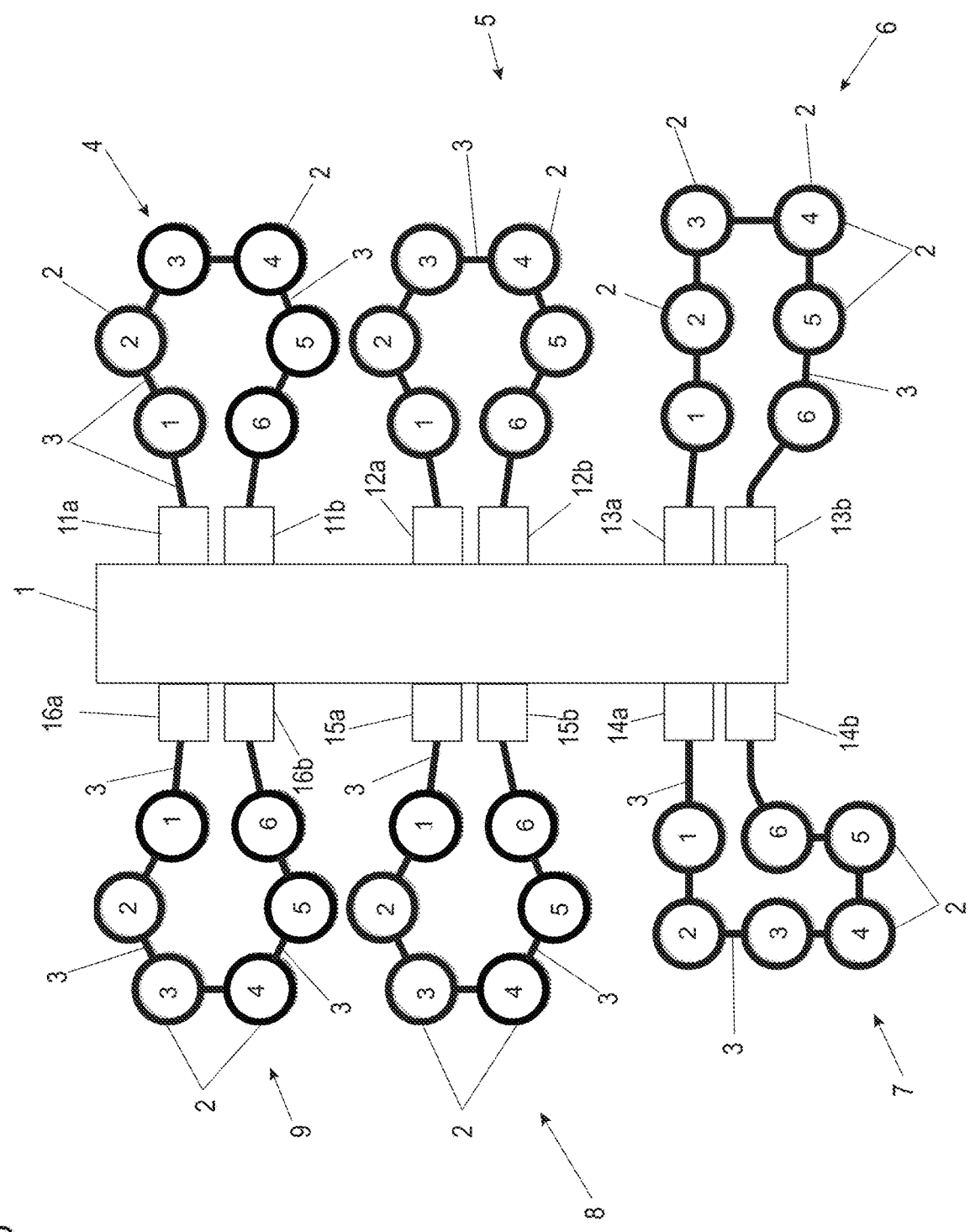
FIG. 5 shows a schematic representation of an arrangement of a plurality of milking places with network subscribers in multiple milking parlors.

Finally, FIG. 5 shows an arrangement of a total of six device groups 4-9 of milking places 2, which in this case do not belong to a common milking parlor, but (as in the milking carousel of FIGS. 3 and 4) are to be assigned to six different milking parlors. All these milking parlors or device groups 4-9 are operated from a common gateway 1. For this purpose, the gateway 1 has twelve ports 11a-16a and 11b-16b, each of which is connected in pairs to one of the daisy chains. The device groups 4-9 can be, for example, clusters of milking places 2, which are also arranged spatially close to each other within the groups, so that the grouping reflects in some way the spatial positioning on a farm. Also, in the example of FIG. 5, the method according to the invention can be carried out independently for each of the groups 4-9 in order to detect the position of the individual milking places 2 within one of the device groups 4-9 and within a daisy chain.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

1 Gateway
11a First port
11b Second port
12a-16a Another first port
12b-16b Another second port
2, 2.1-2.4 Device (milking place)
21.1-21.4 Network subscribers
22.1a-22.4a First port
22.1b-22.4b Second port
23.1-23.4 IP address
24.1-24.4 MAC address
3 Network connection
4-9 Device group (milking parlor)

The invention claimed is:

1. A method for determining a chain position of a network subscriber in an Ethernet network, wherein the Ethernet network includes a plurality of network subscribers connected to one another in a daisy chain and the daisy chain is coupled at its two ends to a respective port of an Ethernet gateway, the method comprising:
(a) deactivating one of the two ports of the Ethernet gateway;
(b) acquiring a status message from one of the plurality of network subscribers concerning a non-connected port of the respective one of the plurality of network subscribers;
(c) extracting at least one identification number from the status message of the respective one of the plurality of network subscribers and assigning a first chain position to the at least one identification number;
(d) deactivating another port of the respective one of the plurality of network subscribers; and
(e) repeating steps (b) to (d) until all of the plurality of network subscribers are acquired with their identification number, wherein subsequent chain positions are assigned in repetitions of step (c).

2. The method of claim 1, wherein the assigned chain positions are acquired in a device table together with the identification numbers of each of the plurality of network subscribers.

3. The method of claim 1, wherein the identification numbers are IP addresses or MAC addresses.

4. The method of claim 1, wherein the status message in step (b) is issued independently by the respective one of the plurality of network subscribers after detection of the non-connected port of the respective one of the plurality of network subscribers.

5. The method of claim 1, wherein the status message in step (b) is issued upon request by the respective one of the plurality of network subscribers.

6. The method of claim 1, wherein the deactivation of the another port in step (d) is carried out independently by the respective one of the plurality of network subscribers after detecting the non-connected port of the respective one of the plurality of network subscribers.

7. The method of claim 1, wherein the deactivation of the another port in step (d) is carried out after detecting the non-connected port upon request by the respective one of the plurality of network subscribers.

8. The method of claim 1, wherein, after step (e), the plurality of network subscribers or the gateway reactivate the deactivated ports again.

9. The method of claim 1, wherein the plurality of network subscribers independently reactivate the ports after a predetermined time after deactivation.

10. The method of claim 1, wherein the plurality of network subscribers independently reactivate the ports when they detect a connection again on the another of the ports of the respective one of the plurality of network subscribers.

11. An system comprising:
- an arrangement of a plurality of agricultural devices, each having at least one network interface, which are connected as network subscribers to an Ethernet gateway in an Ethernet daisy chain topology, wherein the arrangement is configured to
  - (a) deactivate one of the two ports of the Ethernet gateway;
  - (b) acquire a status message from one of the plurality of network subscribers concerning a non-connected port of the respective one of the plurality of network subscribers;
  - (c) extract at least one identification number from the status message of the respective one of the plurality of network subscribers and assigning a first chain position to the at least one identification number;
  - (d) deactivate another port of the respective one of the plurality of network subscribers; and
  - (e) repeat (b) to (d) until all of the plurality of network subscribers are acquired with their identification number, wherein subsequent chain positions are assigned in repetitions of (c).

12. The system of claim 11, wherein the agricultural devices are milking places of a milking carousel.

* * * * *